May 21, 1963  S. FAWCETT  3,090,741
MANIPULATING MACHINES FOR NUCLEAR REACTORS
Filed June 24, 1958
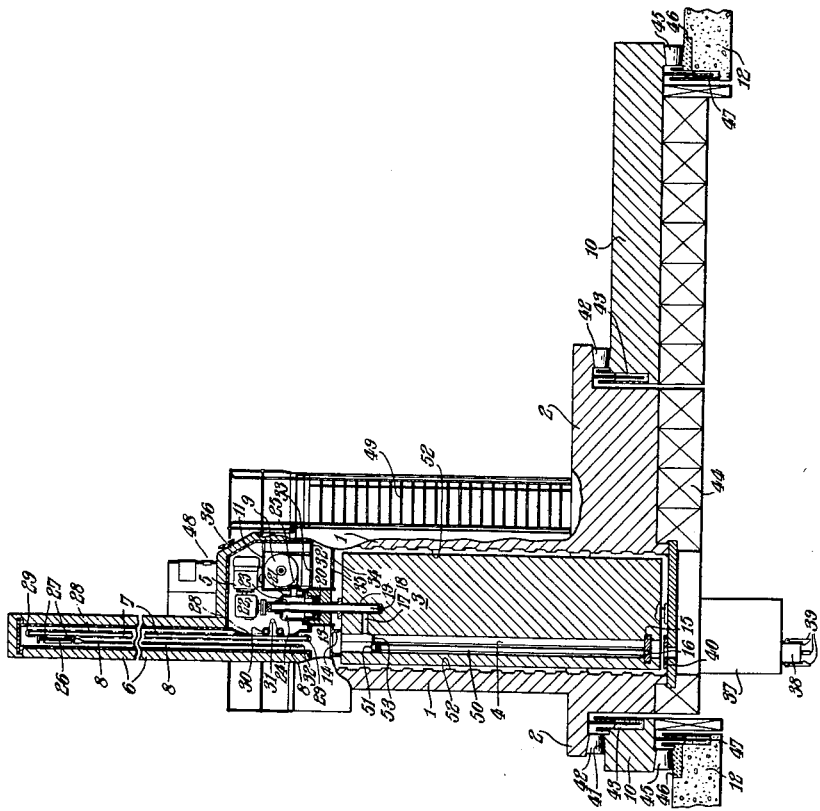
INVENTOR
SYDNEY FAWCETT
BY
ATTORNEYS

United States Patent Office 3,090,741
Patented May 21, 1963

3,090,741
MANIPULATING MACHINES FOR NUCLEAR REACTORS
Sydney Fawcett, Hale Barnes, England, assignor to the United Kingdom Atomic Energy Authority, London, England
Filed June 24, 1958, Ser. No. 744,180
Claims priority, application Great Britain June 24, 1957
3 Claims. (Cl. 204—193.2)

The present invention relates to machines for discharging fuel elements from the core of a nuclear reactor and provides a machine having means for preventing the temperature of a fuel element rising by an excessive amount due to residual fission product heat whilst stored in the apparatus.

The present invention comprises a machine for discharging a fuel element from a nuclear reactor, the machine being of massive construction so as to form part of the gamma ray shielding of the reactor, comprising a fuel element storage chamber, means for withdrawing a fuel element from the core of a nuclear reactor and transferring it to the chamber, means for retaining the fuel element in the chamber, and means for circulating a heat transfer medium over a fuel element in the chamber and through a closed circuit in the machine so that heat generated by the fuel element can be distributed about the machine.

The closed circuit can be completed by channels in the body of the machine or by confined paths over the walls of the machine. The walls may be provided with extended surfaces to aid heat transfer from the heat transfer medium in the machine.

An embodiment of the invention will now be described with reference to the single FIGURE of the accompanying drawing which is a part sectioned elevation.

In the drawing a discharge machine comprising a massive body 1 is supported on a circular rotatable platform 2, and has a fuel element storage magazine 3, fuel element storage chamber 4, a motor 5 for rotating the magazine 3, a fan 9 for circulating a heat transfer medium and an upper body part 6 housing a rack 7 carrying a plunger 8.

The machine completes the gamma ray shielding of the reactor, which shielding comprises a concrete shell 12 and a massive rotatable circular steel platform 10 and the platform 2.

The storage chamber 4 can be partially closed at its lower end by a sliding fuel element support 15 having a central orifice 16. A duct 17 connects the chamber 4 with a passageway 18 formed by a hollow shaft 19 movable in a ball bearing race 20 and journal bearing 21. The shaft 19 takes the drive to the magazine 3 from the motor 5 via a gear box 22. The hollow shaft 19 contains orifices 23 leading into a chamber 24 having an inlet 25 connected to the fan 9. A plate 54 having a hole 33 supports the fan 9, and lies above a base plate 34 having a hole 35. A sealing sleeve 14 seals the fuel element chamber 4 with a closed cavity defined by the upper body part 6 and partitions such as 11 and 13.

The plunger 8 carries a grab 32 at its lower end, and its upper end is screwed to a car 26 having wheels 27 arranged to run on the rack 7. The car 26 is held in position on the rack 7 by a cord 28 which passes round the top and bottom of the rack 7 on pulleys 29 and over pulleys 30 and a driving and tension wheel 31. A gamma ray shield 36 lies over the fan 9, motor 5, etc.

The platform 2 carries a lower extension piece 37 having an extendable standpipe attachment 38 carrying jaws 39. A slide 40 is provided to open a passageway between the body 1 and the attachment 38 for movement of fuel elements etc., into and out of the body 1, or to close off the body 1 from the attachment 38 when coolant gas is circulating in the body. The platform 2 moves on roller bearing 42 running on a track 41 on the massive circular steel platform 10. A mercury seal 43 forms a continuous gas seal. The platform 2 is strengthened by girder structure 44. The platform 10 moves on roller bearings 45 running on a track 46 embedded in the concrete shield 12. A mercury seal 47 prevents gas leaking past the bearings 45. The body 1 is provided with extended heat transfer surfaces 52.

The discharge machine and the movement of the platforms are controlled from a control panel 48 which can be reached by a ladder 49.

A fuel element 50 is shown in the storage chamber 4. The fuel element 50 has a sleeve 51 and is composed of a tube containing cluster of supported fuel rods which are spaced so as to allow the passage of a fluid along the tube and in contact with the fuel rods. It carries a sliding block 53 to seal off the chamber 4.

The operation of the discharge machine illustrated is as follows: By rotation of the platforms 2 and 10 the standpipe 38 can be brought over a channel in the nuclear reactor and connection made with the channel by a standpipe lowered from the magazine 3 and located by the jaws 39. The fuel element storage chamber 4 is opened by removing the fuel element support 15, and operating the slide valve 40, and the rack 7 carrying the car 26 is inserted into the chamber 4. The standpipe 38 is opened and the plunger 8 brought down through it so that the grab 32 can engage a fuel element such as the fuel element 50 through its sleeve 51. The fan 9 is switched on and forces a gas through the inlet 25 of the chamber 24, through the orifices 23, down the passageway 18, through the duct 17 into the chamber 4, into a channel lying between the magazine 3 and the massive body 1, over the extended surfaces 52, up over the top of the magazine 3 and through the orifices 35 and 33 back to the fan. The gas is the same gas as is used as a blanket gas in the reactor. The plunger 8 is raised carrying the fuel element with it into the chamber 4. The support member 15 is slid under the element 50 and the grab 32 disconnected from the sleeve 51. The rack 7 and the car 26 are taken back to their original positions, the sliding seal 14 is placed in position across the chamber and the slide valve 40 is closed.

The present invention allows a fuel element to be removed from a nuclear reactor while the reactor is operating, and at the same time it allows highly rated fuel elements which have been discharged from the reactor to be held in the machine without becoming overheated. The cooling system provided is simple and calls for no secondary coolant medium, the gas circulated by the fan 9 being the same as that used as the blanket gas in the reactor. For a normal discharging sequence a discharged fuel element is stored in the machine for one hour in every six hours, the latter period being the total time taken for discharge of a fuel element. The maximum temperature rise of the body of the machine is calculated to be about 20° C. above ambient condition. The invention allows complete shielding to be maintained. There is no perforation of the shielding to allow entry and exit of coolant pipes as would be required if a secondary coolant medium and heat exchangers were introduced. This is considered to be very important in a sodium-cooled reactor owing to the chemical reactivity of sodium and the high radioactivity of the sodium.

The invention has application in a sodium graphite nuclear reactor such as is disclosed in detail in a co-pending application Serial No. 744,185 of even date in the names of Everett Long and Ronald Scott Challender, now Patent No. 3,000,728, issued September 19, 1961.

I claim:
1. For discharging a fuel element from a nuclear reactor, a machine of massive construction so as to form part of the gamma ray shielding of the reactor and comprising a fuel element storage chamber, means for withdrawing a fuel element from the core of a nuclear reactor and transferring it to the chamber, means for retaining the fuel element in the chamber, and means for circulating a heat transfer medium over a fuel element in the chamber and through a closed circuit in the machine in heat transfer contact with the massive parts of the machine, whereby the machine is caused to function as a heat sink and dissipate heat generated by the fuel element.

2. A machine as claimed in claim 1 wherein the fuel element storage chamber is formed in a fuel element storage magazine rotatably mounted on a hollow shaft, which shaft forms part of the closed circuit in the machine.

3. A machine as claimed in claim 1 wherein the walls of the machine are provided with extended surfaces to aid heat transfer to the machine from the heat transfer medium in the machine.

References Cited in the file of this patent

McLain et al.: "Problems In Nuclear Engineering," vol. 1, pp. 267–277, edited by Hughes et al., Permagon Press 1957; these are selected papers from the 1st Nuclear Engineering & Science Congress, Cleveland, Ohio, Dec. 12–16, 1955.

Nucleonics, June 1955, pp. 52–55, vol. 13, No. 6.